May 27, 1958 V. E. GIULIANO ET AL 2,836,193
CHECK VALVE DEVICE
Filed Dec. 8, 1954

INVENTORS
Vincent E. Giuliano &
BY Robert D. Harvey
J. C. Thorpe
ATTORNEY

United States Patent Office 2,836,193
Patented May 27, 1958

2,836,193

CHECK VALVE DEVICE

Vincent E. Giuliano, Aberdeen Proving Grounds, Md., and Robert D. Harvey, Huntington Woods, Mich., assignors to General Motors Corporation, Detroit, Mich., a corporation of Delaware Application December 8, 1954, Serial No. 473,975

2 Claims. (Cl. 137—514.7)

This invention relates to check valves and particularly those for controlling delivery of fluids such as oil fuel between a fuel injection pump and a delivery nozzle of an internal combustion engine, although it has obvious application to any fluid delivery system wherein flow is timed by changes in supply pressure.

In internal combustion engine pulsating type fuel injection equipment the function of such a check valve between the injection pump and the nozzle is primarily to prevent the fuel in the nozzle line from returning to the pump cylinder and causing voids in the nozzle line. It is also desirable in such systems that the check valve serve to withdraw sufficient fuel from the nozzle line between successive plunger strokes of the pump to reduce the pressure in the nozzle line to a desired level so that pressure waves traveling in the nozzle line do not reopen the nozzle valve after it first closes at the end of the injection.

A third desired function in check valves of the type here involved is to damp the closing movement of the check valve so that the time to seat the valve is made to vary with engine speed when measured in injection cam angle.

It is the principal object of this invention to provide an improved check valve device having all the desired functions aforementioned, together with advantages in design including that of damping valve closing movements by compression of the fluid in the damping chamber, rather than by placing such fluid in tension.

The means by which these and other objects and advantages of the invention are attained will be more readily understood from the following description of a preferred embodiment thereof selected for illustration, having reference to the drawing, wherein.

Figure 1:
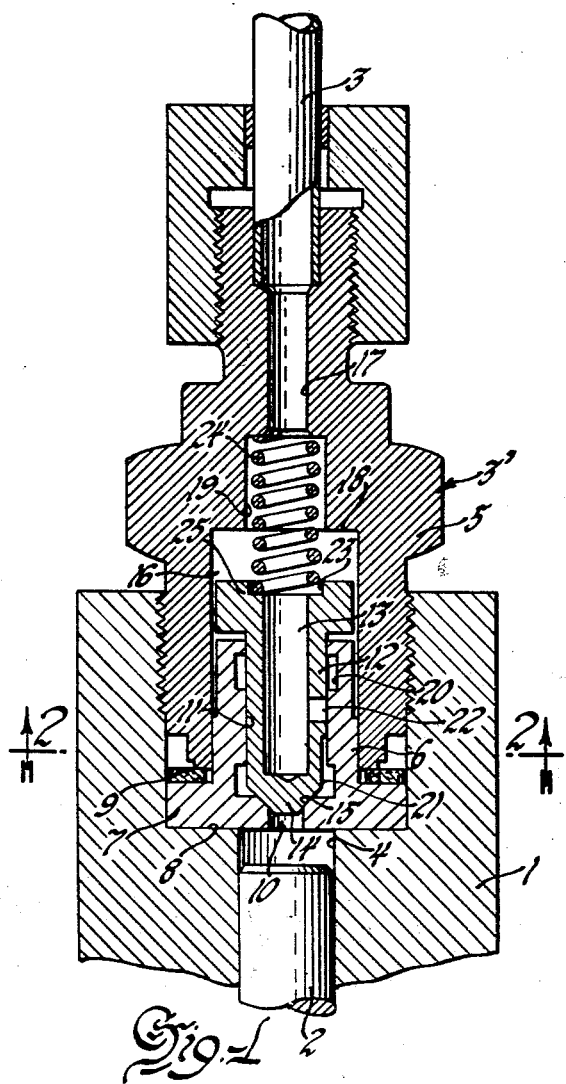
Figure 1 is a view in longitudinal section through portions of a plunger type fuel injection pump and its associated nozzle delivery line and showing the parts of the improved check valve device as installed therebetween.
Figure 2:
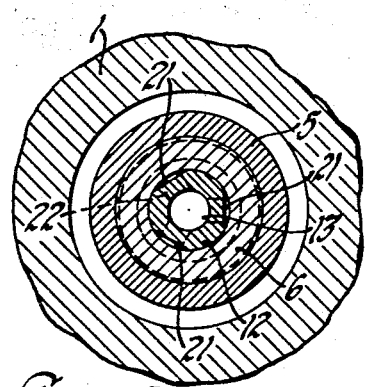
Figure 2 is a fragmentary sectional view taken on line 2—2 of Figure 1.

Referring now in detail to the drawing, a pump body 1 is shown in which a reciprocating plunger 2 operates to force fluid such as diesel fuel through a check valve to a nozzle line 3 which is connected to a suitable nozzle head (not shown). The check valve device is indicated generally by the numeral 3' and comprises means defining a passageway between the pumping chamber 4 of the pump body 1 and the nozzle line 3. Such means includes a hollow housing member 5 having an open end portion which is shown threadedly secured in one end of the pump body. Extending into the open end of the housing member 5 is an inner hollow member 6 having a flange portion 7 overlying the open end face of the housing member 5 and clamped between the latter and the opposing face 8 of the pump body. A gasket 9 is shown to provide a sealed connection against leakage at this point. The flange portion 7 has an aperture 10 forming an inlet to the check valve from the pumping chamber, and within the inner member 6 opposite this inlet is a bore 11 in which is slidably fitted a piston valve 12. This piston valve is also made hollow, having an axial passage 13 open at its upper end as shown but closed at its lower end by a valve head portion 14 which engages an annular seat 15 surrounding the bore end of the inlet 10.

The inner hollow member 6 extends only part way into the housing member 5, and further inward of the latter is a dash pot or damping chamber 16 which is in constant communication both with the nozzle line 3 through an outlet 17 and with the piston valve axial passage 13. A shoulder or end wall 18 within the housing member 4 defines the entrance 19 to the outlet 17, and between this wall 18 and the inner end of the inner member 6 is a dash pot plunger 25 which is formed as a flange-like enlargement of the valve 12 and has a predetermined loose clearance with the side walls of the damping chamber 16.

Adjacent its inwardly extended end the bore 11 is provided with an annular groove 20, and connecting the bore 11 with the axial passage 13 is a port 22 which is spaced upstream from this groove 20 when the valve is seated. The lower external periphery of the valve is provided with one or more flats 21 which extend longitudinally thereof from the head end and terminate a short distance upstream from the port 22. The groove 20 is of sufficient width longitudinally of the valve that when the valve is in its fully opened position the groove 20 interconnects port 22 and the upper ends of the flats 21. A sufficient distance exists between the flats 21 and the lower edge of the groove 20 when the valve is seated, however, that the valve in closing acts to withdraw the desired volume of fluid from the nozzle line after the flats 21 move out of registry with the groove 20.

Seated at its opposite ends in the outlet entrance 19 and in a counterbore 23 at the exit end of the axial passage 13 is a coil compression spring 24 which biases the check valve against its seat 15.

In operation, as the pump plunger 2 moves upward in its body 1 the fuel pressure increases in the pumping chamber 4 to a predetermined value sufficient to displace the check valve from its seat 15 against its return spring 24. No fuel flow from the pumping chamber 4 to the axial passage 13 takes place, however, until the check valve moves upwardly sufficient to effect registry between the upper end of the flats 21 and the lower edge of the groove 20. Fuel flow then begins and continues until a drop in pressure in the pumping chamber occurs to permit the plunger spring 24 to return the valve toward its seat a distance sufficient to again disconnect the flats 21 with the groove 20. Following such interruption of the fuel injection period, and while the valve continues its return to its seated position shown, a quantity of fuel (represented by the unrelieved cross-sectional area of the valve 12 as shown in sec. 2—2 times the distance it travels to its seat) is withdrawn from the damping chamber 16 and nozzle line 3. This withdrawal of fuel is damped by the cushioning effect of the fuel below the valve plunger portion 25 in the damping chamber 16, which fuel is in compression pending its delayed escape around the plunger portion 25 into the upper part of the damping chamber 16.

While only a single preferred embodiment of the invention has been disclosed, it is appreciated that numerous minor changes in the construction and arrangement of the parts may be made without departing from the spirit and scope of the invention as defined in the following claims.

We claim:

1. In a check valve device, a valve body having an inlet, a bore connected at one end to said inlet and terminating at its opposite end in an enlargement, and an outlet connected to said bore by said enlargement, a valve seat at the inlet end of said bore, a piston valve slidably fitting said bore and provided at its respective ends with a head engageable with said seat and a flange extending laterally of said bore into relatively close spaced relation with the side walls of said enlargement, a spring thrustably interposed between said flange and the body acting to bias the valve toward its seat, said valve having an axial passage open at its flanged end and closed at its head end, a transverse port connecting said passage with the bore of said body, and an external passageway extending longitudinally from the head end thereof and terminating in spaced upstream relation thereon from said port, said bore having a recess spaced downstream from said port when the valve is seated and of sufficient extent longitudinally of the bore to interconnect said external passageway and port when the valve is displaced sufficiently from its seat to effect registry between said external passageway and said recess.

2. In a check valve device, a valve body including a housing member having an open end adapted to be threadedly connected to a supporting structure through which fluid under pressure is to be delivered and an inner hollow member extending into said open end, said inner member having a flange portion overlying said open end and adapted to be clamped between said open end and the supporting structure, said inner member having a bore and said flange having an aperture for connecting one end of said bore with the interior of said supporting structure, a valve seat on said flange surrounding the bore end of said aperture, said housing member having an outlet for passage of fluid and a shoulder defining the entrance to said outlet and spaced from the extended end of said inner member, said bore having an annular groove adjacent its end nearest said shoulder, a hollow externally cylindrical piston valve slidably fitting the bore and engageable with said seat to close said aperture, said piston valve being open at its opposite end to the interior of the housing downstream of said inner member and having a transverse port connecting the interior of the piston valve with said bore at distance upstream from said groove when the valve is seated, said valve having its external periphery relieved by a flat extending from the valve seat end thereof and terminating at a distance upstream thereof from said port, and a coil compression spring having one end seated in the entrance to said outlet and its opposite end seated on the extended end of the valve, said extended end of the valve being flanged outwardly to cooperate with the internal surface of the housing and said extended end of the inner member to form a dash pot downstream of said bore.

References Cited in the file of this patent
UNITED STATES PATENTS

| | | |
|---|---|---|
| 396,259 | Bell | Jan. 15, 1889 |
| 1,250,388 | Titus | Dec. 18, 1917 |
| 2,234,932 | Schlaupitz | Mar. 11, 1941 |
| 2,411,930 | Mathys | Dec. 3, 1946 |
| 2,440,027 | Stoyke | Apr. 20, 1948 |
| 2,583,295 | Greer | Jan. 22, 1952 |
| 2,644,481 | Perlman | July 7, 1953 |